(12) United States Patent
Rouskov et al.

(10) Patent No.: US 8,549,298 B2
(45) Date of Patent: Oct. 1, 2013

(54) SECURE ONLINE SERVICE PROVIDER COMMUNICATION

(75) Inventors: Yordan I. Rouskov, Kirkland, WA (US); Rui Chen, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1057 days.

(21) Appl. No.: 12/040,366

(22) Filed: Feb. 29, 2008

(65) Prior Publication Data

US 2009/0222656 A1    Sep. 3, 2009

(51) Int. Cl.
*H04L 9/32* (2006.01)
*H04L 9/08* (2006.01)
*G06F 15/16* (2006.01)

(52) U.S. Cl.
USPC ............... 713/171; 713/173; 380/283; 726/4; 726/5; 726/6

(58) Field of Classification Search
USPC .......... 713/168–174, 182–186, 202; 709/225, 709/229; 726/2–6
See application file for complete search history.

(56) References Cited

U.S. PATENT DOCUMENTS

| | | | |
|---|---|---|---|
| 6,105,012 A | 8/2000 | Chang | |
| 6,351,812 B1 | 2/2002 | Datar | |
| 7,039,946 B1 | 5/2006 | Binding | |
| 7,093,129 B1 | 8/2006 | Gavagni | |
| 7,191,467 B1 | 3/2007 | Dujari | |
| 7,240,192 B1 | 7/2007 | Paya | |
| 2002/0150253 A1* | 10/2002 | Brezak et al. | 380/281 |
| 2003/0061512 A1 | 3/2003 | Flurry | |
| 2003/0135734 A1 | 7/2003 | Fagan | |
| 2003/0177351 A1 | 9/2003 | Skingle | |
| 2003/0204732 A1 | 10/2003 | Audebert | |
| 2004/0030887 A1* | 2/2004 | Harrisville-Wolff et al. | 713/155 |
| 2004/0088260 A1 | 5/2004 | Foster | |
| 2004/0230825 A1 | 11/2004 | Shepherd | |
| 2004/0250066 A1 | 12/2004 | Di Luoffo | |
| 2005/0144452 A1 | 6/2005 | Lynch | |
| 2005/0193093 A1 | 9/2005 | Ashvin | |
| 2005/0204041 A1 | 9/2005 | Blinn | |

(Continued)

OTHER PUBLICATIONS

Toni Nykanen, Secure Cross-Platform Single Sign-On Solution for the World-Wide Web, Master's thesis, May 27, 2002, Helsinki University of Technology, Department of Computer Science and Engineering, http://users.tkk.fi/~tpnykane/thesis/tpnykane_2002.pdf.

(Continued)

*Primary Examiner* — Evans Desrosiers
(74) *Attorney, Agent, or Firm* — Shook, Hardy & Bacon LLP (57) ABSTRACT

Computer-readable media, systems, and methods for encrypting communications between a client and an online service provider to ensure the communications are secure. In embodiments an authentication request is received from a user agent associated with the client and the authentication request includes identification information and authentication information. Additionally, it is determined that the identification and authentication information are associated with a user. An authentication ticket is created that includes a user identification and an authentication and indicates to the online service provider that the user is authenticated to access one or more services. Further, a session key is generated and an encrypted session key is embedded into the authentication ticket. The session key is encrypted and the private key is known only to the online service provider and the public key is known at least by an authentication server.

16 Claims, 6 Drawing Sheets

U.S. PATENT DOCUMENTS

| | | | |
|---|---|---|---|
| 2006/0048212 A1* | 3/2006 | Tsuruoka et al. | 726/4 |
| 2007/0027818 A1 | 2/2007 | Lofgren | |
| 2007/0189542 A1* | 8/2007 | Alldredge | 380/283 |
| 2008/0072303 A1* | 3/2008 | Syed | 726/10 |

OTHER PUBLICATIONS

The UA NetID WebAuth Service: An Introduction, Adapted for the UA NetID WebAuth project by Gary Windham, University of Arizona, Center for Computing and Information Technology, last updated Oct. 20, 2005, http://netid.ccit.arizona.edu/apidocs/webauth/index.html.

David Orrell, Scoping Next Generation Athens Services, Eduserv Athens, Eduserv Technologies Ltd 2004, http://www.athensams.net/upload/athens/pdf/athens_ng_scoping_1.0.pdf.

R. Schemers and R. Allbery, WebAuth V3 Technical Specification, Stanford University, Jan. 2006, http://webauth.stanford.edu/protocol.html.

Davey Winder, "Free Webmail Crypto Browser Extension for Firefox," Sep. 8, 2006, 3 pages, http://www.daniweb.com/blogs/entry 860.html.

Birgit Pfitzmann and Michael Waidner, IBM Zurich Research Lab, "Privacy in Browser-Based Attribute Exchange," 2002, 11 pages, http://www.zurich.ibm.com/security/publications/2002/PfiWai2002bBBAE-privacy-WPES.pdf.

Pwdhash, "Browser Extension for Secure Passwords," Oct. 19, 2007, pp. 1-3, http://www.security-hacks.com/2007/04/27/pwdhash-browser-extension-for-secure-passwords.

Kent Cearley and Lindsay Winsor, University of Colorado System Office, Boulder, Colorado, "Securing IT Resources with Digital Certificates and LDAP," pp. 1-12, Oct. 19, 2007, http://www.educause.edu/ir/library/html/cnc9707/cnc9707.html.

* cited by examiner

SECURE ONLINE SERVICE PROVIDER COMMUNICATION

BACKGROUND

Online services often involve the communication of sensitive material between the user agent associated with a client computer and the online service provider. At the very least, as in the case of an online email service, the user would prefer hostile parties not have access to the communicated information. In other circumstances, such as online banking or investment management, it is essential to the user that the communicated information cannot be intercepted by a hostile party. Because of the sensitivity, mechanisms such as identification and authentication are used to ensure authenticated access. For instance, an authentication server may verify a user and pass an authentication ticket to the online service provider. But, in the wrong hands, the authentication ticket may allow access by a hostile party to private information. Unfortunately, there is no effective way to ensure secure communication between a user and an online service provider.

SUMMARY

Embodiments of the present invention provide computer-readable media, systems, and methods for encrypting communications between a client and an online service provider to ensure the communications are secure. In embodiments an authentication request is received from a user agent associated with the client. The authentication request includes identification information and authentication information. Additionally, it is determined that the identification and authentication information are associated with a user. An authentication ticket is created that includes a user identification and an authentication and indicates to the online service provider that the user is authenticated to access one or more services. Further, a session key is generated and an encrypted session key is embedded into the authentication ticket. The session key is encrypted and the private key is known only to the online service provider and the public key is known at least by the authentication server.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer-readable media, systems, and methods for encrypting communications between a client and an online service provider to ensure the communications are secure. In embodiments an authentication request is received from a user agent associated with the client. The authentication request includes identification information and authentication information. Additionally, it is determined that the identification and authentication information are associated with a user. An authentication ticket is created that includes a user identification and an authentication and indicates to the online service provider that the user is authenticated to access one or more services. Further, a session key is generated and an encrypted session key is embedded into the authentication ticket. The session key is encrypted using asymmetric cryptography where the private key is known only to the online service provider and the public key is known at least by the authentication server. Although embodiments of the present invention are discussed herein in the context of asymmetric cryptography, other types of cryptography are contemplated by the inventors and within the scope of embodiments of the present invention. For instance, in embodiments, the permanent key may be encrypted using permanent symmetrical cryptography. As used herein the phrases "online service(s)" and "online service provider(s)" are intended to include various types of online services. For instance, online services may include email, e-commerce, online banking, online social networking, personalized web services, etc. Thus, as will be understood and appreciated by those having skill in the art, it is contemplated and within the scope of the present invention that online services include various online services requiring user identification and authentication.

Accordingly, in one aspect, the present invention is directed to one or more computer-readable media having computer-usable instructions embodied thereon for performing a method of encrypting communications between a client and an online service provider to ensure the communications are secure. The method includes receiving an authentication request from a user agent associated with the client. The authentication request includes identification information and authentication information. The method further includes determining that the identification and authentication information are associated with a user and creating an authentication ticket. The authentication ticket indicates to the online service provider that the user is authenticated to access services provided by the online service provider. Further, the method includes generating a session key and embedding an encrypted session key into the authentication ticket. The encrypted session key is encrypted with a permanent key using asymmetric cryptography where the private key is known only to the online service provider and the public key is known at least to an authentication server.

In another aspect, the present invention is directed to a computerized system for encrypting communications between a client and an online service provider to ensure the communications are secure. In this aspect, the system includes a receiving component configured to receive an authentication request from a user agent associated with the client. The authentication request includes identification information and authentication information. Further, the system includes a determining component configured to determine that the identification and authentication information are associated with a user and a creating component configured to create an authentication ticket that includes a user identification and an authentication. The authentication ticket indicates to the online service provider that the user is authenticated to access services provided by the online service provider. The system further includes a generating component configured to generate a session key and an embedding component configured to embed an encrypted session key into the authentication ticket. The session key is encrypted with a permanent key using asymmetric cryptography where the private key is known only to the online service provider and the public key is known at least to an authentication server.

In yet another aspect, the present invention is directed to one or more computer-readable media having computer-usable instructions embodied thereon for performing a method of encrypting communications between a client and an online service provider to ensure the communications are secure. In this aspect, the method includes generating a permanent key using asymmetric cryptography. The permanent key includes a private key known only to the online service provide and a public key known at least to an authentication server. The method further includes receiving an authentication ticket that includes a user identification and an authentication. The authentication ticket indicates that the user is authenticated to access one or more services provided by the online service provider. And the authentication ticket includes an encrypted session key that has been generated and encrypted by the authentication server using the public key. The method further includes decrypting the encrypted session key using the private key to obtain an unencrypted session key and encrypting information associated with online services using the unencrypted session key. Still further, the method includes communicating the encrypted information to the user agent. The user agent receives the encrypted information and decrypts the encrypted information with logic in a browser extension using the unencrypted session key that was received by from the authentication server. Also, the user agent presents the decrypted information associated with the services to the user.

Having briefly described an overview of embodiments of the present invention, an exemplary operating environment is described below.

Figure 1:
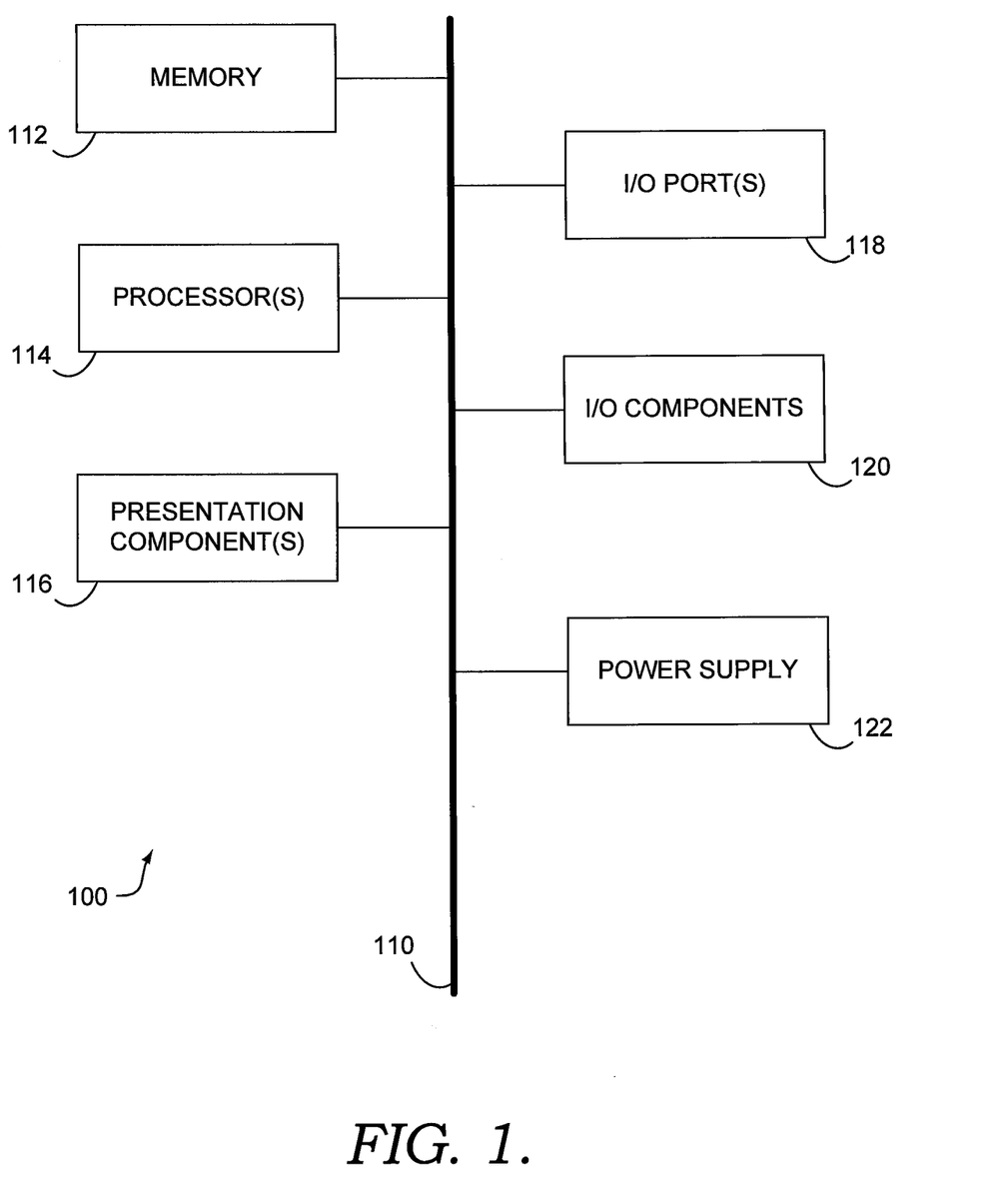
FIG. 1 is a block diagram of an exemplary computing system environment suitable for use in implementing the present invention.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. The phrase "computer-usable instructions" may be used herein to include the computer code and machine-usable instructions. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD), or other optical or holographic media; magnetic cassettes, magnetic tape, magnetic disk storage, or other magnetic storage devices; or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
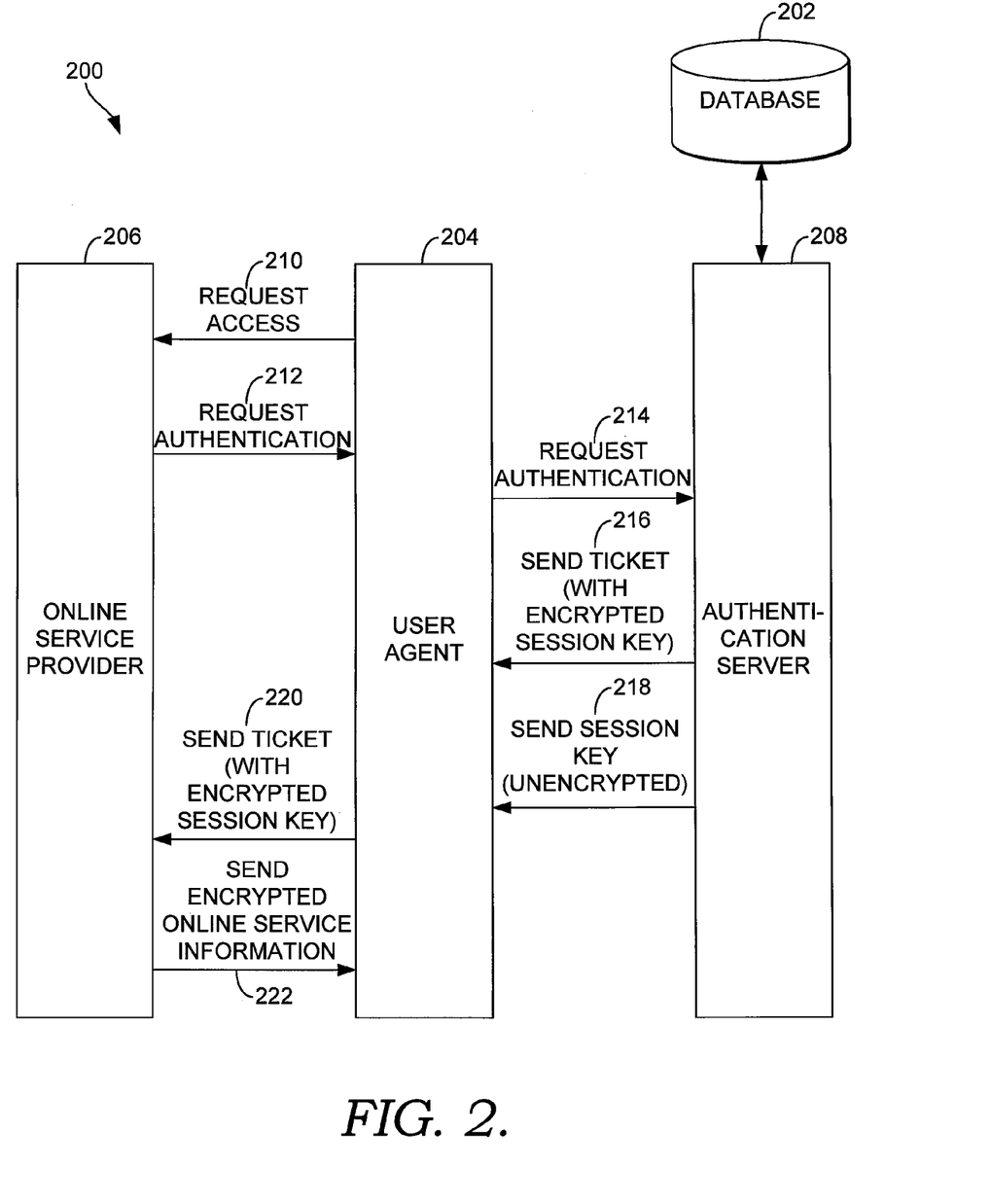
FIG. 2 is a block diagram illustrating an exemplary environment for secure online service provider communication, in accordance with an embodiment of the present invention.

Turning now to FIG. 2, a block diagram is provided illustrating an exemplary environment 200 for secure online service provider communication. The environment 200 includes a database 202, a user agent 204, an online service provider 206, and an authentication server 208 in communication with one another. For instance, database 202, user agent 204, online service provider 206, and authentication server 208 may be in communication using a network that may include, without limitation, one or more local area networks (LANs), wide area networks (WANs), and/or the Internet Such networking environments are commonplace in offices, enterprise-wide computer networks, and the Internet. Accordingly, specific features of the network is not further described herein.

Database 202 is configured to store information associated with secure online service provider communications. In various embodiments, without limitation, such information may include authentication information such as identity and authentication. For instance, the identity and authentication may be a username and password for a user. In various embodiments, database 202 is configured to be searchable so that authentication server 208 may retrieve identity and authentication information for a user to confirm authentication of the user with an online service provider. Further, in various embodiments, without limitation, information stored on database 202 may include encryption information such as encryption logic and various encryption keys. For instance, the online service provider may use a permanent key to ensure secure communications. The public version of that key may be stored in a database, such as database 202, for access by, among others, an authentication server such as authentication server 208. Database 202 may be configurable and may include various information relevant to secure online service provider communications. The content and/or volume of such information are not intended to limit the scope of embodiments of the present invention in any way. Further, although illustrated as a single, independent component, database 202 may, in fact, be a plurality of databases, for instance, a database cluster, portions of which may reside on a computing device associated with user agent 204, online service provider 206, authentication server 208, on another external computing device, or any combination thereof. Still further, although illustrated as independent from authentication server 208, in various embodiments, the entirety of database 202 may reside on a computing device associated with authentication server 208.

Figure 3:
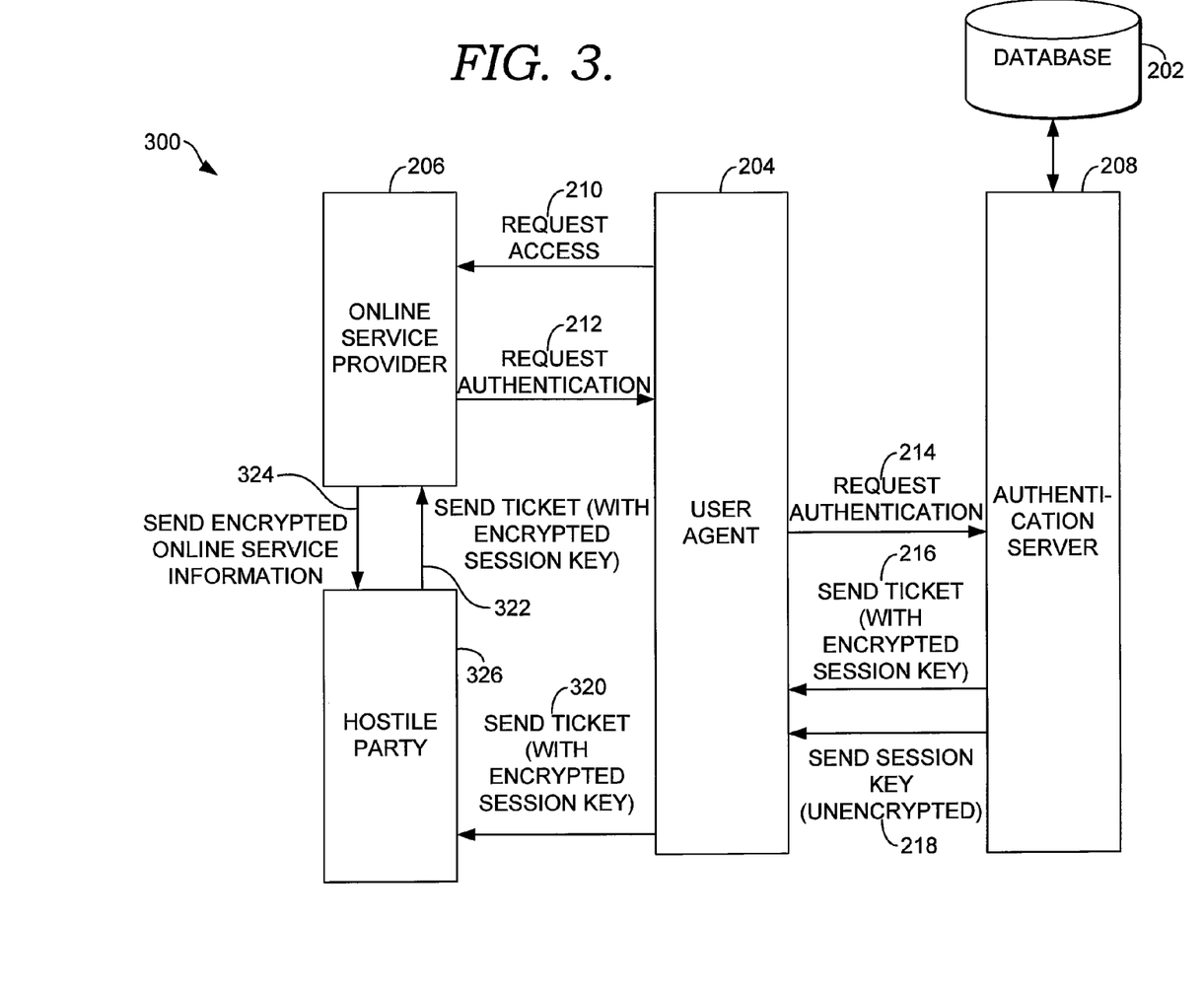
FIG. 3 is a block diagram illustrating an exemplary environment for secure online service provider communication, the diagram illustrating the effect of a hostile party obtaining access to the communication between the online service provider and the user agent, in accordance with an embodiment of the present invention.

Before engaging in a discussion of the details of secure online service provider communications, an exemplary overview discussion of authentication tickets, in the context of online service provider communications, will be presented referencing FIGS. 2 and 3 to help illustrate the overall functionality of environment 200 in various embodiments. Accordingly, in embodiments, where a user is accessing a network with user agent 204, such as a web browser, and where the user attempts to access an online service operated by an online service provider, such as online service provider 206, user agent 204 may send a request to online service provider 206. Examples discussed herein refer to a user attempting to access a single online service offered by an online service provider. Embodiments of the present invention, however, contemplate that one authenticated access may allow a user to visit various online services without requiring more than one authentication. For instance, a user may log into an online account and have access to more than one service, such as email and a social networking site, associated with the online service provider. Thus, embodiments of the present invention are not limited to the exemplary embodiments discussing a single access point to a single service because it is contemplated that a single access point may be used for multiple online services. Referring back to FIG. 2, and assuming that the online service requested by the user is email, an access request will be sent to the email provider as illustrated by numeral 210. The request may include a set of identification information and a set of authentication information, such as a username and password, that the user is required to submit to access the email account.

As illustrated at numerals 212 and 214, in embodiments, the online service provider of the email service may not perform an authentication internally and may thus request authentication from an authentication server, such as authentication server 208, through user agent 204. In embodiments, the user may not recognize that the online service provider has requested authentication through the user agent to an authentication server. For instance, where the user agent is a web browser, the user may just see a login screen to the user's email account. Having entered a username and password, the user may not recognize that the web browser is requesting authentication from an authentication server. The authentication server, upon receiving an authentication request, may create a ticket to send to the online service provider (through the user agent as illustrated at numerals 216 and 218) confirming that the identification and authentication information entered by the user are associated and that the user should be granted access by the online service provider to one or more online services. For instance, referring to the email example, the authentication server will confirm that the address and password entered by the user are associated and, if so, the authentication server will create a ticket and send the ticket to the email provider instructing the email provider to grant access to the user. And the user may then access his or her email.

Embodiments of the present invention employ encryption functionality to ensure secure communications between the online service provider and the user agent. For instance, in embodiments, the online service provider, such as online service provider 206, creates a permanent key for encrypting communications. Using asymmetric encryption, the permanent key has both a private key and a public key. The private key is known only to the online service provider to ensure that it is protected. But the public key is made available, for instance, to authentication servers, such as authentication server 208. In embodiments, the authentication server generates a session key for a communication session between the user agent and the online service provider. An encrypted version of the session key is embedded into the ticket, along with the other ticket information described above, and sent to the user agent as illustrated with numeral 216. Also, an unencrypted version of the session key is sent to the user agent, through a secure communications link as illustrated at numeral 218. Thus, the user agent has available both a ticket (confirming authentication and including an encrypted session key) and an unencrypted session key.

To access the online service (email in the present example) the user agent sends the ticket (confirming authentication and including an encrypted session key) to the online service provider as illustrated with numeral 220. The online service provider confirms authentication and decrypts the encrypted session key from the ticket using the permanent key. Stated differently, embodiments of the present invention include two keys. The first key, a permanent key (of which, in embodiments, there is one per online service provider), is used to encrypt session keys (of which there are one or more keys corresponding to each session). Because the private key portion of the permanent key is known only to the online service provider, only the online service provider may decrypt the encrypted session key as the session key is encrypted using the public key portion of the permanent key. Thus, upon receiving an encrypted session key in an authentication ticket, the online service provider will decrypt the session ticket. In embodiments the session key may be nothing more than a random number generated by the authentication server. In other embodiments, the session key may be more complex, including various expirees. For instance, the session key may have a session-based expiree, ensuring that the key is invalid after the end of a particular session between an online service provider and a user agent. The session key may also have a time-based expiree, invalidating the session key after a particular session has been ongoing for more than a specified period of time.

Armed with a decrypted version of the session key, or rather the original session key, the online service provider can use the session key to encrypt information that is to be sent to the user agent. In the email example, the online service provider may encrypt the user's inbox with the session key. Because the user agent received an unencrypted session key from the authentication server, as illustrated at numeral 218, the user agent is able to decrypt any encrypted information from the online service provider. Thus, as illustrated at numeral 222, having received encrypted online service information, the user agent decrypts the information using the unencrypted session key received from the authentication server at numeral 218 and presents the email inbox to the user.

In various embodiments, the logic for storing the unencrypted session key and decrypting online service information may be employed on the user agent using a web extension. For instance, the web extension may use a component object module, allowing for language-neutral implementation of the encryption object on various types of web browsers or other user agents. Stated differently, the logic in the web extension may instruct the user agent to store the unencrypted session key received from the authentication server locally. Also, the web extension may instruct the user agent to decrypt information from the online service provider using the unencrypted session key. Still further, the web extension may be used to limit the application of the encryption functionality to particular websites. For instance, the user agent may only decrypt information that originates at online service providers that are known not to be hostile. In embodiments, the web extension may be downloaded by the user agent upon installation of another application. For instance, when a user installs a messenger service, part of the installation may attach web extensions to the various user agents available on the user's device. But embodiments of the present invention are not limited to an implementation involving web extensions. Instead, embodiments of the present invention are directed to various implementations of encryption functionality to secure online service provider communications. It is contemplated and within the scope of the present invention that other implementations may be used for this functionality. For instance, the encryption logic and user agent instructions may be included in the original software code for the user agent.

As illustrated in FIG. 3, a hostile party 326 may intercept a ticket from a user agent, as shown at numeral 320. And the hostile party may attempt to use the ticket to communicate with the online service provider, as illustrated at numerals 322 and 324. Although in this scenario the online service provider may not recognize that the hostile party is hostile, and may thus send information to the hostile party, the hostile party will not be able to decipher the information because it will be encrypted. Stated differently, the unencrypted session key is stored on the user agent and is not passed along to the online service provider. Thus, without the unencrypted session key, the hostile party is not able to decrypt the information from the online service provider. Even assuming the hostile party was sophisticated enough to parse the authentication ticket that has been intercepted, the hostile party could still not obtain the unencrypted session key. As discussed above, the session key included in the ticket is encrypted using a permanent key and the online service provider is the only party that can decrypt the session key included in the authentication ticket. Without the session key, the hostile party cannot understand the information from the online service provider. The hostile party cannot obtain the unencrypted session key from the user agent because the user agent stores it locally and does not communicate the unencrypted key to the online service provider. Nor can the hostile party obtain the unencrypted session key from the ticket because the session key in the ticket has been encrypted by a permanent key that only the online service provider can decrypt.

Having provided an overview discussion of environments in which secure online service provider communication may take place, including interception of communications by a hostile party, an exemplary system for secure online service provider communication will now be discussed. In that regard, turning not to FIG. 4, a block diagram is provided illustrating an exemplary system 400 for secure online service provider communication, in accordance with an embodiment of the present invention. The system 400 includes a database 402 and authentication server 404. Database 402 is similar to database 202 discussed with reference to FIGS. 2 and 3 and, thus, database 402 is configured to store information associated with secure online service provider communications. In various embodiments, without limitation, such information may include authentication information such as identity and authentication. For instance, the identity and authentication may be a username and password for a user. In various embodiments, database 402 is configured to be searchable so that authentication server 404 may retrieve identity and authentication information for a user to confirm authentication of the user with an online service provider. Further, in various embodiments, without limitation, information stored on database 402 may include encryption information such as encryption logic and various encryption keys. For instance, the online service provider may use a permanent key to ensure secure communications. The public version of that key may be stored in a database, such as database 402, for access by, among others, an authentication server such as authentication server 404. Database 402 may be configurable and may include various information relevant to secure online service provider communications. The content and/or volume of such information are not intended to limit the scope of embodiments of the present invention in any way. Further, although illustrated as a single, independent component, database 402 may, in fact, be a plurality of databases, for instance, a database cluster, portions of which may reside on authentication server 404, on another external computing device, or a combination thereof. Still further, although illustrated as independent from authentication server 404, in various embodiments, the entirety of database 402 may reside on a computing device associated with authentication server 404.

Figure 4:
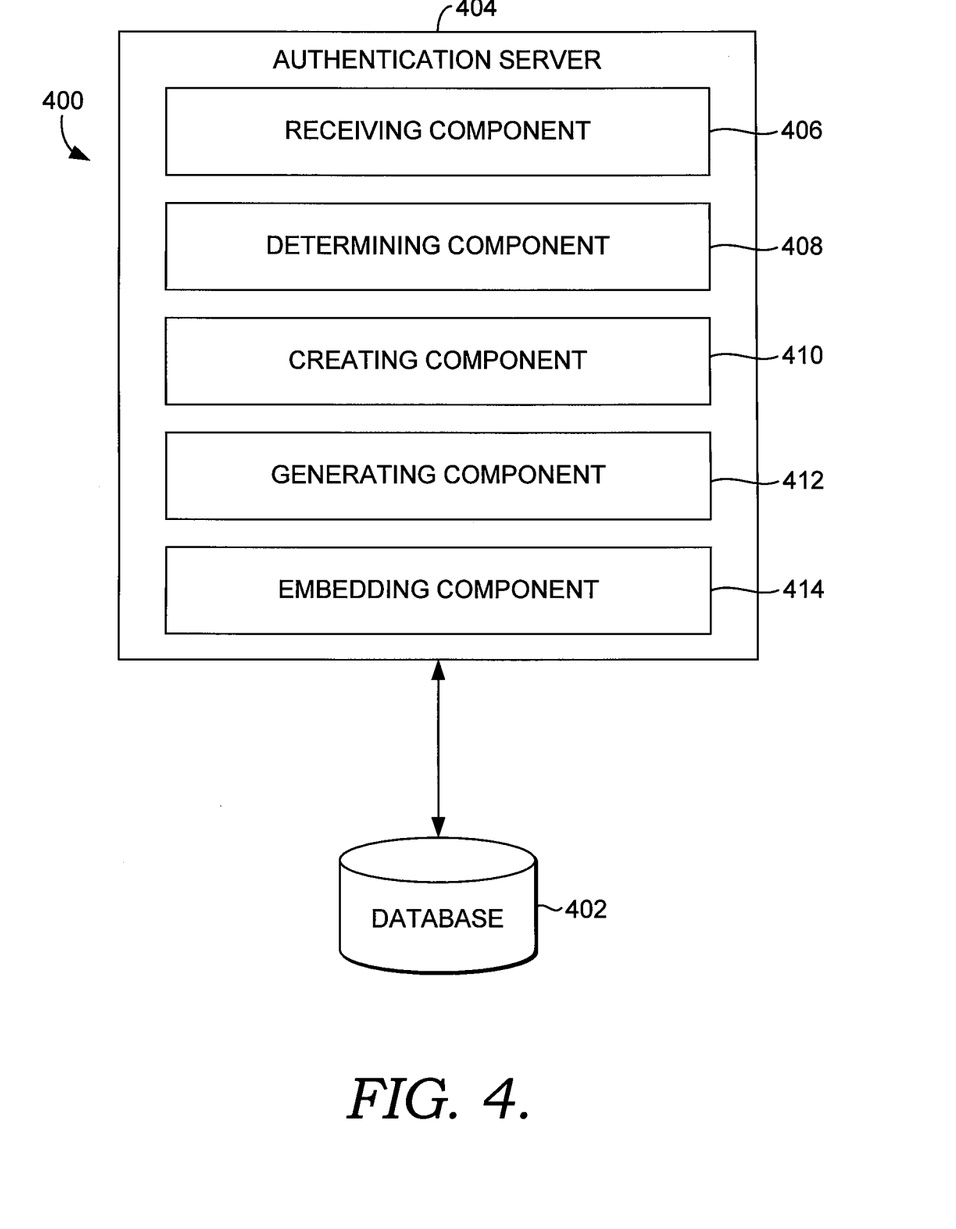
FIG. 4 is a block diagram illustrating an exemplary system for secure online service provider communication, in accordance with an embodiment of the present invention.

Authentication server 404 includes a receiving component 406, a determining component 408, a creating component 410, a generating component 412, and an embedding component 414. Receiving component 406 is configured to receive an authentication request from a user agent associated with a client (such as computing device 100 of FIG. 1). As previously discussed, the user agent may, in various embodiments, be a web browser associated with the client. In embodiments, the authentication request may include a set of identification information and a set of authentication information. For instance, in embodiments, the identification and authentication information may be a username and password. Embodiments of the present invention, however, are not limited to only a username and password. For instance, in embodiments, an account number or some other number associated with the user may be used as identification information. Also, various authentication information may be used including, but not limited to, a fingerprint or an answer to a prompted question. Each of these types of identification and authentication information, and others, are contemplated and within the scope of the present invention.

Determining component 408 is configured to determine that the set of identification information and the set of authentication information are associated with a user. For instance, in embodiments, determining component 408 may compare the identification information with a table of identification information stored, by way of example, on database 402. Upon finding a matching set of identification information, determining component 408 may compare stored authentication information with the authentication information received in the authentication request. Where there is matching information, determining component 408 may determine that the information provided in the authentication request is associated with the user and that the user is suitably authenticated. Stated differently, determining component 408 may, in embodiments, determine that the user should be granted access to the online services the user is requesting.

Creating component 410 is configured to create an authentication ticket including a user identification and an authentication. The authentication ticket indicates to the online service provider that the user is authenticated to access one or more services provided by the online service provider. Stated differently, upon requesting and receiving an authentication ticket, an online service provider may grant access to a user seeking admission into one or more online services. In various embodiments, the authentication ticket is encoded with a time stamp, tamper-proofing mechanisms, and various other information provided by the authentication server.

Generating component 412 is configured to generate a session key for secure communications between a client and an online service provider. As previously discussed with reference to FIGS. 2 and 3, the session key ensures that if a hostile party obtains communications between a client and an online service provider, the hostile party will be unable to interpret the communications because it will not have the session key to perform the necessary decryption. As mentioned above, in embodiments, a session key may be a random number or pseudo-random number generated of a particular length. Also, in embodiments, a session key may include a session-based and/or a time-based expiree, rendering the session key invalid to decrypt information upon expiration of the expiree.

Embedding component 414 is configured to embed an encrypted session key into the authentication ticket. The encrypted session key is encrypted with a permanent key using asymmetric cryptography. The permanent key includes a private key known only to the online service provider and a public key known at least to an authentication server. In other words, the session key is encrypted in a manner in which only the online service provider can decrypt it. Thus, even where a hostile party obtains the ticket and extracts the encrypted session key, the encrypted session key will be of no use to the hostile party because the hostile party does not have the tools to decrypt it.

It will be understood and appreciated by those of ordinary skill in the art that additional components not shown may also be included within any of system 400, database 402, and authentication server 404.

Figure 5:
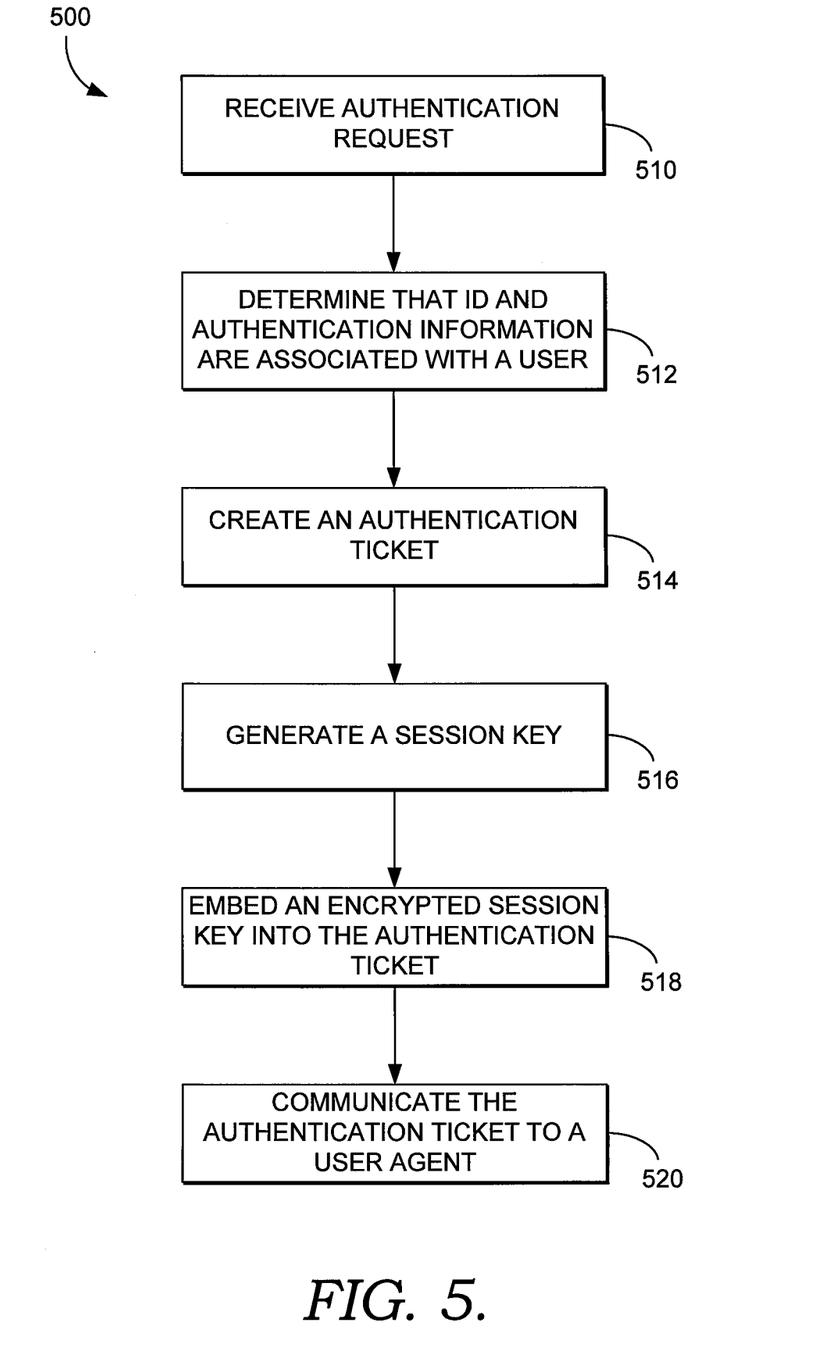
FIG. 5 is a flow diagram illustrating an exemplary method for secure online service provider communication, in accordance with an embodiment of the present invention.

Turning now to FIG. 5, a flow diagram of an exemplary method for secure online service provider communication, in accordance with an embodiment of the present invention, is illustrated and designated generally as reference numeral 500. Initially, as indicated at step 510, an authentication request is received, e.g., by receiving component 406 of FIG. 4. For instance, where a user seeks to access one or more online services using a client computer and a user agent, such as a web browser, an authentication request may be generated by the online service provider once the user has entered a set of identification information and a set of authentication information. In other words, the online service provider may send a request to authenticate that the information entered by the user is accurate and that it matches an account in an online service. As previously stated, the identification information and the authentication information entered by the user may be a username and a password. But, embodiments of the present invention are not limited to just a username and password and, as previously discussed, other types of identification and authentication information may be submitted by the user when the user requests access to an online service.

Next, as indicated at step 512, it is determined that the identification and authentication information are associated with a user, e.g., by determining component 408 of FIG. 4. For instance, where the username and password are associated and where the username corresponds with an account in the online service, it will be determined that the identification information and authentication information are associated with a user for that online service. In other words, this step is the initial authentication step that authenticates that the user requesting access to the online service has information authenticating access. Next, as indicated at step 514, an authentication ticket is created, e.g., by creating component 410 of FIG. 4. As previously discussed, the authentication ticket, in various embodiments, may include information indicating to the online service provider that the user is authenticated to access one or more services provided by the online service provider.

At step 516 a session key is generated for secure communications between a client and an online service provider, e.g., by generating component 412 of FIG. 4. As previously discussed, the session key may be a random number generated by an authentication server, such as authentication server 404 of FIG. 4. In embodiments, the session key may have a session-based and/or a time-based expiree. At step 518, the encrypted session key is embedded into the authentication ticket, e.g., by embedding component 414 of FIG. 4. In embodiments, the session key is encrypted with a permanent key using asymmetric cryptography. The private key portion of the permanent key is known only to the online service provider and the public key portion of the permanent key is known at least to an authentication server, e.g., authentication server 404 of FIG. 4. And at step 520, the authentication ticket is communicated to a user agent.

Figure 6:
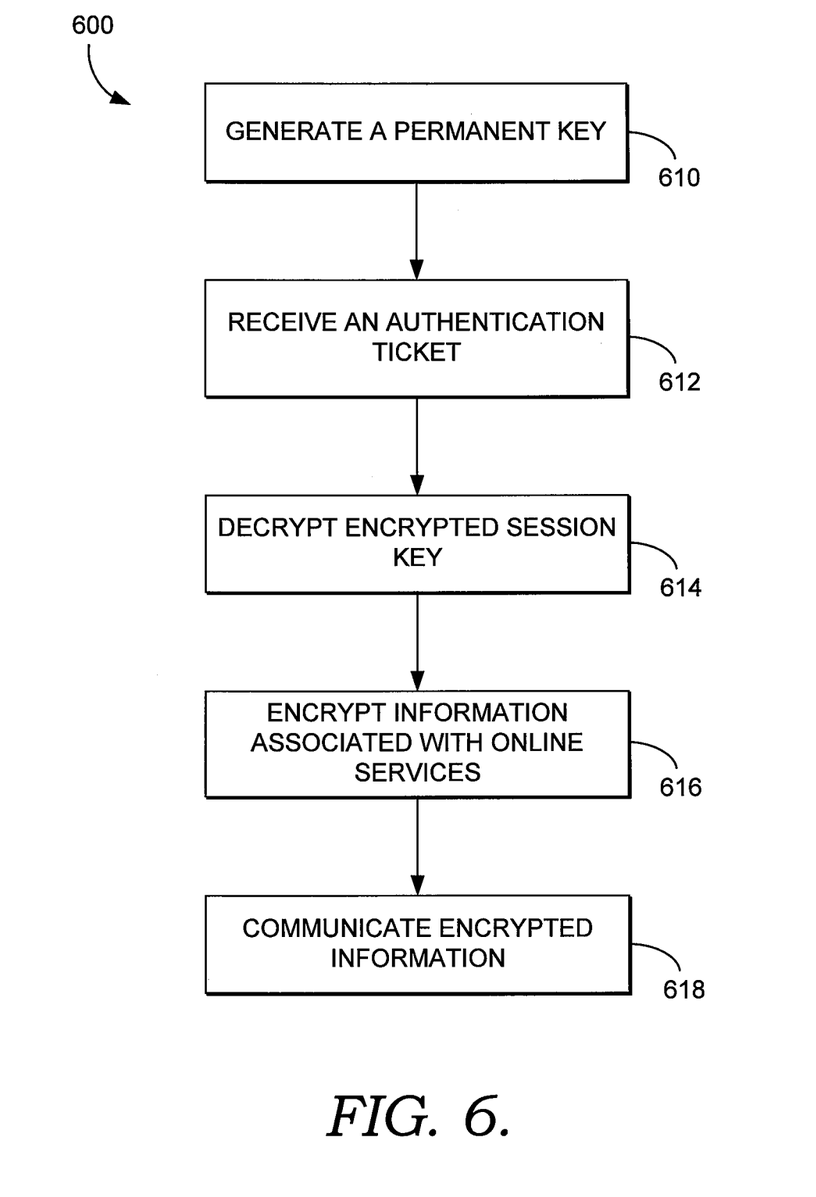
FIG. 6 is a flow diagram illustrating an exemplary method for secure online service provider communication, the method having a different point of view than the method illustrated in FIG. 5, in accordance with an embodiment of the present invention.

Turning now to FIG. 6, a flow diagram of an exemplary method for secure online service provider communications, the method having a different point of view than the method illustrated in FIG. 5, in accordance with an embodiment of the present invention, is illustrated and designated generally as reference numeral 600. Initially, as indicated at step 610, a permanent key is generated using asymmetric cryptography. As previously discussed, in embodiments, the permanent key includes a private key known only to the online service provider and a public key known at least to an authentication server, e.g., authentication server 404 of FIG. 4.

At step 612, an authentication ticket is received that includes a user identification and an authentication. The authentication ticket indicates that the user is authenticated to access services provided by the online service provider. In addition to the identification and authentication, the authentication ticket includes an encrypted session key that has been generated and encrypted using the public portion of the permanent key, e.g., by generating component 412 of FIG. 4. As previously discussed, and as illustrated at step 614, the encrypted session key is decrypted using the private key to obtain the unencrypted session key. Then, because only the online service provider and the user agent have access to an unencrypted session key, information associated with the services are encrypted using the unencrypted session key, as illustrated at step 616. And the encrypted information is communicated to the user agent, as illustrated at step 618, thereby ensuring secure communications between the online service provider and the client associated with the user agent.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more tangible computer-readable storage devices having computer-usable instructions embodied thereon that when executed by a computing device having a processor and memory, cause the computing device to perform a method of securing communications between a client and an online service provider, the method comprising:

receiving an authentication request from a user agent associated with the client, the authentication request including a set of identification information and a set of authentication information;

determining that the set of identification information and the set of authentication information are associated with a user;

at an authentication server, creating an authentication ticket including a user identification and an authentication, the authentication ticket indicating to the online service provider that the user is authenticated to access one or more services provided by the online service provider;

generating, by way of the computing device, a session key for secure communications between a client and an online service provider, the session key comprising a random arrangement of numbers;

embedding an encrypted session key into the authentication ticket that is communicated from the user agent to the online service provider prior to the user agent accessing the one or more services provided by the online service provider, the authentication ticket including the user identification and the authentication, the encrypted session key encrypted using a permanent key, wherein the permanent key includes a private key known only to the online service provider and a public key known at least to the authentication server such that once the online service provider has decrypted the encrypted session key from the authentication ticket using the private key to obtain an unencrypted session key, the online service provider uses the unencrypted session key to encrypt information that is sent to the user agent; and communicating the unencrypted session key to the user agent that stores the unencrypted session key locally.

2. The tangible computer-readable storage devices of claim 1, wherein the method further comprises communicating the authentication ticket to the user agent, and wherein the user agent utilizes the authentication ticket to allow the user to gain access to the one or more services.

3. The tangible computer-readable storage devices claim 2, wherein the online service provider encrypts information associated with the one or more services using the unencrypted session key and communicates the encrypted information to the user agent.

4. The tangible computer-readable storage devices of claim 3, wherein the user agent receives the encrypted information and decrypts the encrypted information using the unencrypted session key.

5. The tangible computer-readable storage devices of claim 4, wherein the user agent presents the decrypted information associated with the one or more services to the user.

6. The tangible computer-readable storage devices of claim 5, wherein the session key includes a session-based expiree that renders the session key ineffective for decrypting the encrypted information in any session between the user agent and the online service provider other than the current session.

7. The tangible computer-readable storage devices of claim 6, wherein the session key further includes a time-based expiree that renders the session key ineffective for decrypting the encrypted information after a specified period of time.

8. The tangible computer-readable storage devices of claim 7, wherein the user agent is a web browser, and wherein the encrypted information is decrypted by the user agent with logic stored on the client as a browser extension.

9. The tangible computer-readable storage devices of claim 8, wherein the browser extension is implemented using a component object model, providing for language-neutral object implementation.

10. The tangible computer-readable storage devices of claim 9, wherein only specified online service providers can invoke the browser extension.

11. The tangible computer-readable storage devices of claim 10, wherein the permanent key is encrypted using asymmetric cryptography.

12. A computerized system for securing communications between a client and an online service provider, the system comprising:
- a receiving application that receives an authentication request from a user agent associated with the client, the authentication request including a set of identification information and a set of authentication information;
- a determining application that determines that the set of identification information and the set of authentication information are associated with a user;
- a creating application that creates, at an authentication server, the authentication ticket including a user identification and an authentication, the authentication ticket indicating to the online service provider that the user is authenticated to access one or more services provided by the online service provider;
- a generating application that generates a session key for secure communications between a client and an online service provider, the session key comprising a random arrangement of numbers;
- an embedding application that embeds an encrypted session key into the authentication ticket that includes the user identification and the authentication, the encrypted session key encrypted using a permanent key using asymmetric cryptography, wherein the permanent key includes a private key known only to the online service provider and a public key known at least to the authentication server such that once the online service provider has decrypted the encrypted session key from the authentication ticket using the private key to obtain an unencrypted session key, the online service provider uses the unencrypted session key to encrypt information that is sent to the user agent, and wherein the unencrypted session key is communicated to the user agent that stores the unencrypted session key locally; and
- a database for storing information associated with secure online service provider communication.

13. The computerized system of claim 12, further comprising a ticket communicating component that communicates the authentication ticket to the user agent, wherein the user agent utilizes the authentication ticket to allow the user to gain access to one or more services.

14. The computerized system of claim 12, wherein the online service provider encrypts information associated with the one or more services using the unencrypted session key and communicates the encrypted information to the user agent.

15. The computerized system of claim 14, wherein the user agent receives the encrypted information and decrypts the encrypted information using the unencrypted session key, and wherein the user agent presents the decrypted information associated with the one or more services to the user.

16. One or more tangible computer-readable storage devices having computer-usable instructions embodied thereon that when executed by a computing device having a processor and memory, cause the computing device to perform a method of securing communications between a client and an online service provider, the method comprising:
- generating, by way of the computing device, a permanent key using asymmetric cryptography, wherein the permanent key includes a private key known only to the online service provider and a public key known at least to an authentication server;
- receiving an authentication ticket including a user identification and an authentication, wherein the authentication ticket indicates that the user is authenticated to access one or more services provided by the online service provider, and wherein the authentication ticket includes an encrypted session key that has been generated and encrypted by the authentication server using the public key, the encrypted session key comprising a random arrangement of numbers, and wherein an unencrypted session key is stored on a user agent and is not communicated to the online service provider to prevent a hostile party from decrypting information from the online service provider such that the online service provider is the only party that can decrypt the encrypted session key;
- decrypting the encrypted session key using the private key to obtain an unencrypted session key, the unencrypted session key comprising the random arrangement of numbers;
- encrypting information associated with the one or more services using the unencrypted session key; and
- communicating the encrypted information to the user agent,
- wherein the user agent receives the encrypted information and decrypts the encrypted information with logic in a browser extension using the unencrypted session key that was received by from the authentication server, and
- wherein the user agent presents the decrypted information associated with the one or more services to the user.

* * * * *